US005997678A

United States Patent [19]

Wess et al.

[11] Patent Number: 5,997,678

[45] Date of Patent: Dec. 7, 1999

[54] METHOD AND APPARATUS FOR TRANSFERRING IMAGES ONTO A TUBULAR STRUCTURE

[75] Inventors: Raymond E. Wess, Holley; Carlos F. Rezende, Rochester; Daniel C. Davis, Rush, all of N.Y.

[73] Assignee: Eastman Kodak Company, Rochester, N.Y.

[21] Appl. No.: 08/843,685

[22] Filed: Apr. 10, 1997

[51] Int. Cl.[6] .......................... B44C 1/165; B32B 31/00; B30B 5/02; F26B 21/12

[52] U.S. Cl. ....................... 156/240; 156/272.2; 156/359; 156/384; 156/499; 156/583.1; 428/195; 428/202; 428/207; 34/241; 34/439; 34/440; 219/244; 219/521

[58] Field of Search .................................... 156/230–231, 156/232, 234, 235, 237, 238, 239, 240, 241, 247, 272.2, 579, 583.1, 358, 359, 367, 475, 384, 387, 540, 499, 583.3, 583.8, DIG. 5, DIG. 8, DIG. 12, DIG. 41, DIG. 51; 34/241, 439, 440, 104, 166; 428/195, 200, 202, 207, 145; 219/244, 243, 535, 521, 544, 546, 548, 549

[56] References Cited

U.S. PATENT DOCUMENTS 1,076,858 10/1913 Andrews .
1,841,332 1/1932 Kranz ....................................... 219/520
2,298,315 10/1942 Siegel et al. .............................. 201/67
2,965,868 12/1960 Eichler ...................................... 430/24
3,827,477 8/1974 Weiner et al. ............................. 165/1
4,352,659 10/1982 Salmela et al. ........................... 432/10
4,874,454 10/1989 Talalay et al. .......................... 156/359
4,943,684 7/1990 Kramer ................................. 428/34.4
4,989,508 2/1991 King .......................................... 101/35
5,019,193 5/1991 Aramini .................................... 156/64
5,140,666 8/1992 Lamb ...................................... 392/382
5,199,188 4/1993 Franz ........................................ 34/105
5,244,529 9/1993 Siegel ..................................... 156/384
5,296,081 3/1994 Morin et al. ............................ 156/498
5,706,588 1/1998 Dausch et al. ............................ 34/327
5,711,837 1/1998 Kantrowitz .............................. 156/215
5,755,921 5/1998 Christensen ............................. 156/391

*Primary Examiner*—Curtis Mayes
*Assistant Examiner*—J. A. Lorengo
*Attorney, Agent, or Firm*—Frank Pincelli

[57] ABSTRACT

A method and apparatus for imprinting a sublimation transfer onto a generally cup-shaped or tubular structure. The apparatus includes a support structure for holding of the structure. A blower is provided for providing a flow of heating air to the interior surface of the structure. A control device is provided for directing the flow of heating air in a uniform manner about the interior surface of the structure.

6 Claims, 7 Drawing Sheets

METHOD AND APPARATUS FOR TRANSFERRING IMAGES ONTO A TUBULAR STRUCTURE

FIELD OF THE INVENTION

The present invention relates to a method and apparatus for transferring images onto a tubular structure, more specifically, a method and apparatus for transferring dye sublimation ink transfers onto cups, mugs, and other similar cylindrical type structures, hereinafter collectively called mugs.

BACKGROUND OF THE INVENTION

The printing of sublimation transfers onto a mug by heating is well known. The printing process involves the transferring of an image on the sublimation transfer by heat and contact pressure. There are many types of sublimation transfers that can be imprinted by various printing devices, for example, copy machines, laser printers, printing presses, etc. The key to all these image transfers is that they all use a form of "sublimation" ink. The sublimation transfer is made up of two basic parts: the transfer release paper, and sublimation dyes. The sublimation dyes are printed onto the transfer release paper. The heat transfer process heats the transfer paper and sublimation dye to a predetermined temperature. As the temperature of the mug rises during the heating cycle time, the sublimation dyes start to transfer from transfer paper to the mug. The transmissiveness of sublimation dyes from the transfer paper to the mug is the key to any heat transfer process. Different types of sublimation transfers transfer at different operating temperatures. However, the primary requirement for obtaining a good image transfer is the uniform heating of the mug. If there are "cold spots" around the mug due to non-uniform heating, undesirable non-uniform transfer of the dye onto the mug will occur, resulting in a low quality product.

There are various known techniques for heating a mug and image transfer for transferring the image to the mug. For example, U.S. Pat. No. 5,019,193 describes a mug press with a heated blanket. U.S. Pat. No. 4,989,508 describes a method for clamping a transfer onto a mug which is heated by hot air conduction. U.S. Pat. No. 4,874,454 describes a flexible transfer head with a flexible heating element. U.S. Pat. No. 5,244,529 describes a clamp and mug transfer system where heat is applied to the mug by an electric heating blanket. A problem associated with heating blankets are that they are expensive and have a short life. In addition, it is difficult to construct a reliable blanket that provides uniform pressure and heat. Other prior art types heating systems tend to provide non-uniform heating.

The present invention provides a unique method and apparatus that provides uniform heating of the mug, which results in excellent transfer of images, while maintaining high reliability and long life.

SUMMARY OF THE INVENTION

In accordance with one aspect of the present invention there is provided method of imprinting sublimation transfers onto a generally cup-shaped or tubular structure. The structure having a generally cylindrical outer surface and an inner surface. The method, comprising the steps of:

a) applying the sublimation transfer to the outer surface of the structure;

b) applying pressure against said transfer so as to force said transfer against said outer surface of the mug;

c) supplying a flow of heated air to the interior surface of said structure; and d) controlling the flow of said heated air so as to substantially and evenly distribute heat internally of said structure.

In accordance with another aspect of the present invention there is provided an apparatus for imprinting a sublimation transfer onto a generally cup-shaped or tubular structure. The apparatus comprising:

a support structure for holding of said cup structure;

a blower for providing a flow of heating air to the interior surface of said cup-shaped structure; and means for directing the flow of heating air in a uniform manner about the interior surface of said cup-shaped structure.

BRIEF DESCRIPTION OF THE DRAWINGS

Other objects, advantages and features of the present invention will become apparent from the following specification when taken in conjunction with the drawings in which like elements are commonly enumerated and in which.

DETAILED DESCRIPTION OF THE INVENTION

Figure 1:
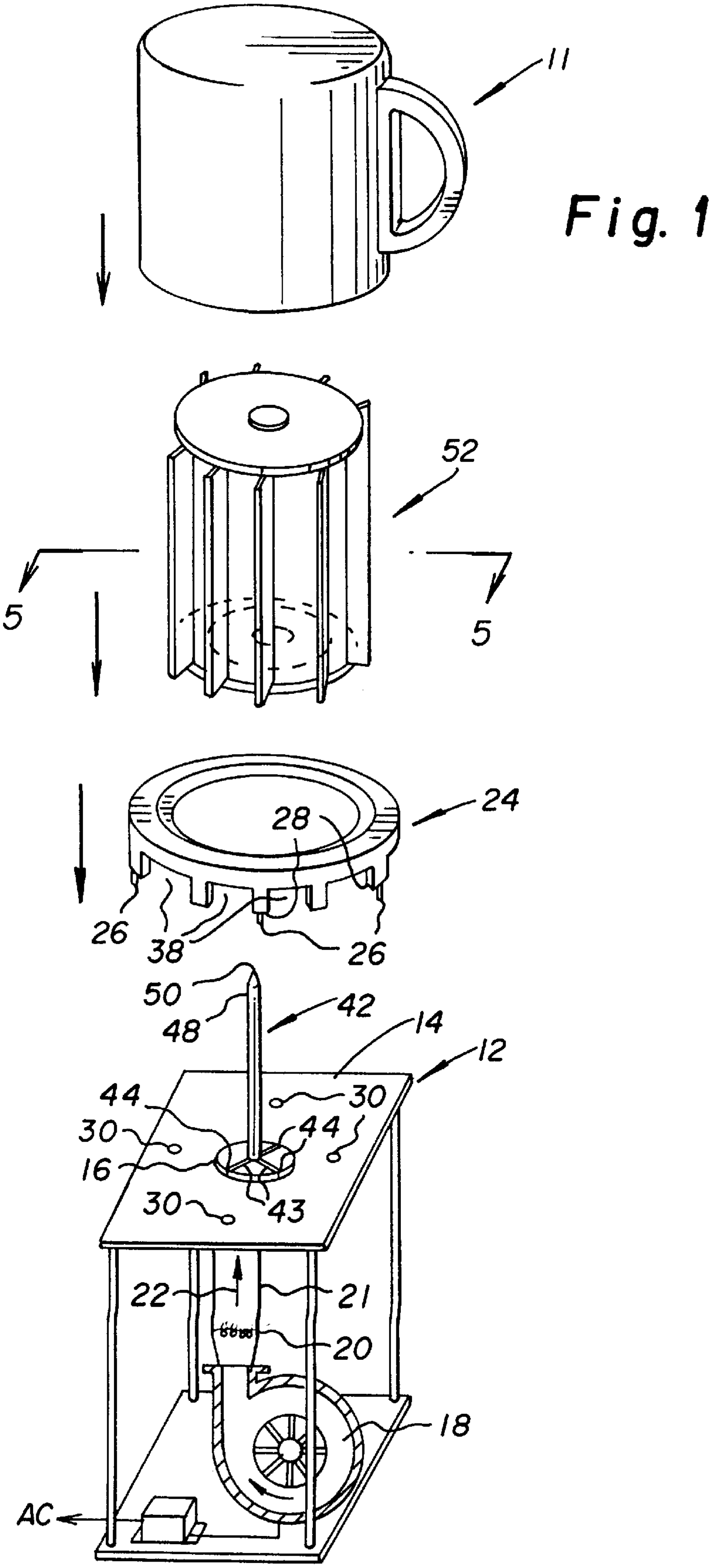
FIG. 1 is an exploded perspective view of an apparatus made in accordance with the present invention and a mug for placement thereon.
Figure 2:
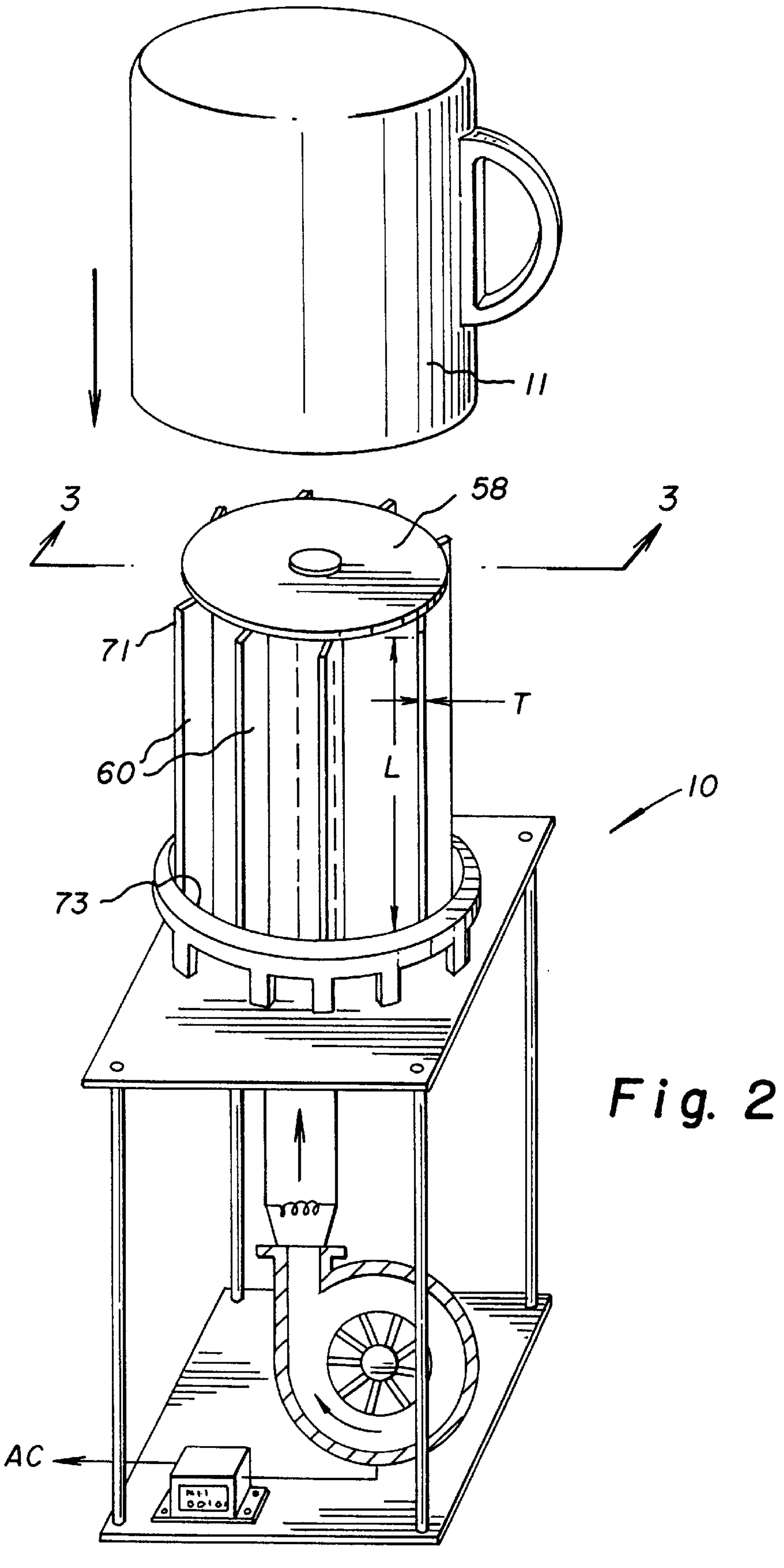
FIG. 2 is perspective view of the assembled apparatus of FIG. 1 illustrating the mug prior to placement thereon.

Referring to FIGS. 1, 2, 3, 4, and 5, there is illustrated an apparatus 10 made in accordance with the present invention for transferring images from a sublimation dye transfer to a mug 11, or other similar type cup-shaped structure. The apparatus 10 includes a base 12 having a support surface 14. The base includes means for supplying hot air out of an opening 16 provided in support surface 14. In particular, a blower 18 is provided for blowing air past heating coils 20 in supply duct 21 thereby causing a flow of hot air out of duct 21 to opening 16 as indicated by arrow 22. A removable annular mug support ring 24 is provided on top of support surface 14 for supporting mug 11 in the inverted position as illustrated. In the preferred embodiment illustrated, annular support ring 24 is provided with a plurality of projections 26 provided on the bottom surface 28, each of which is designed to engage a mating opening 30 provided in support surface 14. The annular ring 24 has a mug support surface 32 for supporting the mug 11 and an annular inner vertical support surface 36 designed to engage the outside surface of mug 11 placed on annular support ring 24. The ring is sized such that it does not interfere with the flow of hot air through opening 16. The projections 26 and mating openings 30 are positioned such that the mug will be positioned concentric about opening 16. The annular support ring 24 is provided .with a plurality of passages 38 to allow heated air to escape as discussed later herein. It is to be understood that any number of different size support rings 24 may be provided for accommodating any desired size mug. Since the support ring 24 simply rests on support surface 14, the desired size ring is simply positioned such that the projections 26 align with the corresponding openings 30.

A support pin 42 is provided concentrically with respect to the annular support ring 24 and opening 16. The support pin 42 has a base secured to the mounting surface 14 by support ribs 43 which have their outer ends 44 secured to support surface 14. The support ribs 43 do not significantly interfere with the air blowing out of opening 16. The upper end 48 of pin 42 terminates in a conical point 50.

Figure 3:
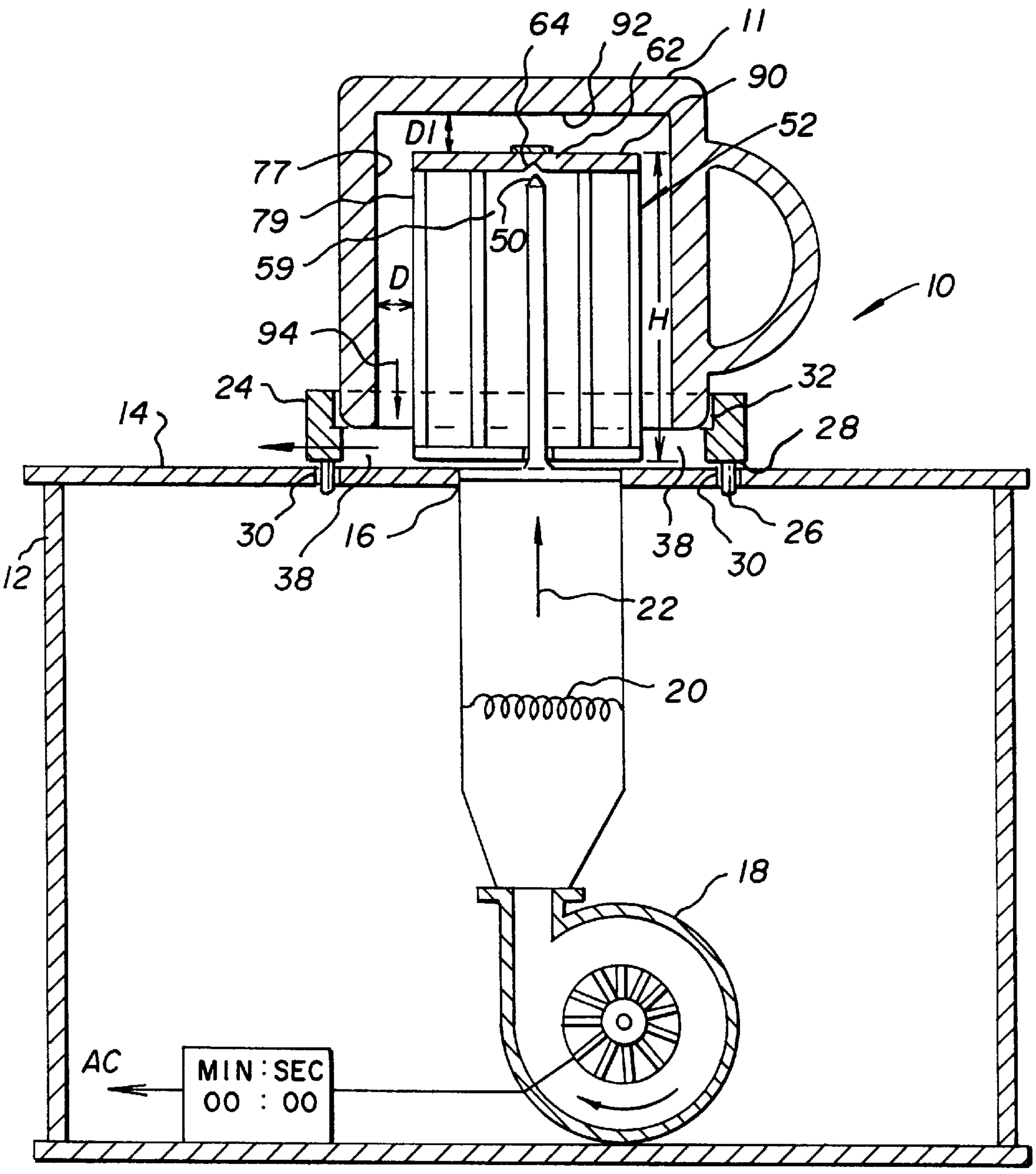
FIG. 3 is a cross-sectional view of the apparatus of FIG. 2 as taken along line 3—3 illustrating a mug having a sublimation dye transfer clamped thereto and positioned on the apparatus for heating.
Figure 4:
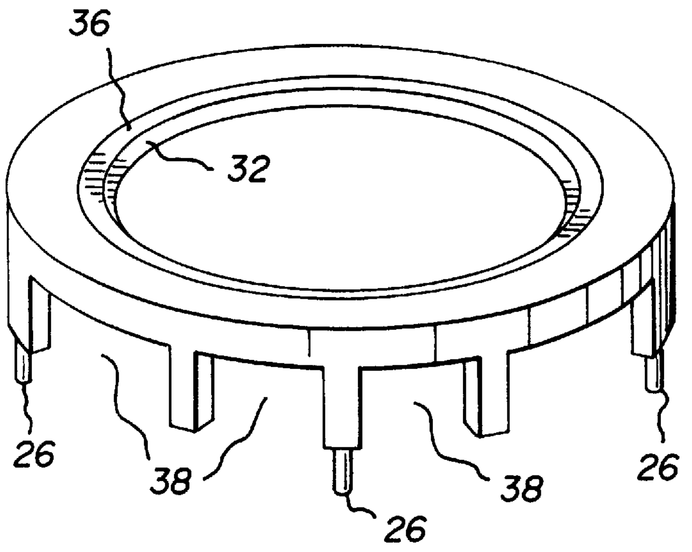
FIG. 4 is an enlarged perspective view of the support ring of the apparatus of FIG. 1.
Figure 5:
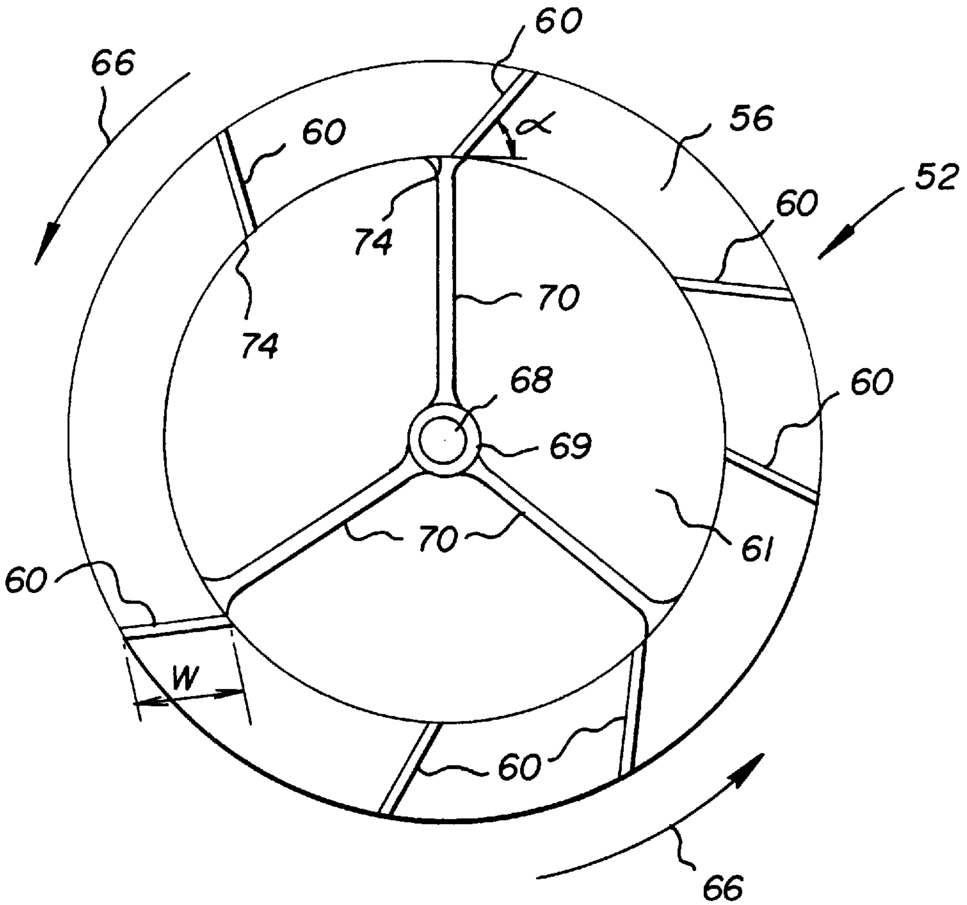
FIG. 5 is a cross-sectional view of the turbine of FIG. 1 as taken along line 5—5 of FIG. 1.

A turbine 52 is provided for directing air to the interior of mug 11 placed in the inverted position on annular support ring 24, as illustrated in FIGS. 1, 3 and 5. The turbine 52 comprises a lower plate 56, an upper plate 58, and a plurality of blades 60 extending between the plates 56,58 for directing air from the interior section 59 to the periphery of the turbine 52. The lower plate 56 has an opening 61 which is in co-alignment with opening 16, such that air coming out of the opening 16 will be directed to the interior section 59 of turbine 52. The top plate has a mounting member section 62, which has a conical seat 64 designed to mate with the conical point 50 of pin 42 such that the turbine 52 will easily rotate about pin 42 as illustrated by arrow 66 in FIG. 5. As also illustrated by FIG. 5, the pin 42 extends through an opening 68 provided in centering ring 69, which is secured to lower plate 56 by a plurality of support member ribs 70. Ribs 70 do not significantly interfere with the flow of heated air to the interior section 59 of turbine 52.

The upper and lower ends 71,73 of blades 60 of turbine 52 engage grooves (not shown) provided in plates 56, 58 and are secured thereto in any desired manner. In the embodiment illustrated the blades 60 are adhesively secured to the upper and lower plates 56,58. The blades 60 are preferably equally spaced about the circumference of the turbine 52, and are disposed at an angle α with respect to a line tangent to a circle drawn to the interior side 74 of blade 60. It is to be understood that angle ox may be varied as desired. In the particular embodiment, angle α is preferably between 55° and 75°. In the particular embodiment illustrated, α is approximately 61.5°.

The number of blades 60 provided on turbine 52 have a direct effect on the turbines rotation and thus the air flow rate. Applicants have found that having eight blades provides the appropriate air distribution within the mug. Additionally, Applicants have found that the distance D between the inner surface 77 of mug 11 and the outer periphery 79 of the turbine 52 can have a substantial effect on the velocity and turbulence of the air flow. If the distance D is too small, then the pressure ratio may be sufficiently high to slow the turbines motion, and if the distance D is too large, the vorticity of the air flow could have an adverse effect on the turbines efficiency. Applicants have found that distance D for a cup having an inside diameter of 2.75 inches should be approximately 0.25 inches. However, the distance D may be varied as appropriate. Also, the height H of the turbine 52 is such that the mug 11, when positioned in the inverted position on annular support ring 24, that a relatively small distance DI exists between the bottom 92 of mug 11 and the top 90 of turbine 52 so air flowing out of the periphery of the turbine flows directly downward, as indicated by arrow 94 and out passages 38. It is also understood that the length L of the blade may be varied as appropriate. In the particular embodiment illustrated, the blade has a width W of about 0.5 inches, thickness T of about 0.020 inches and a length L of about 2.62 inches.

Figure 6:
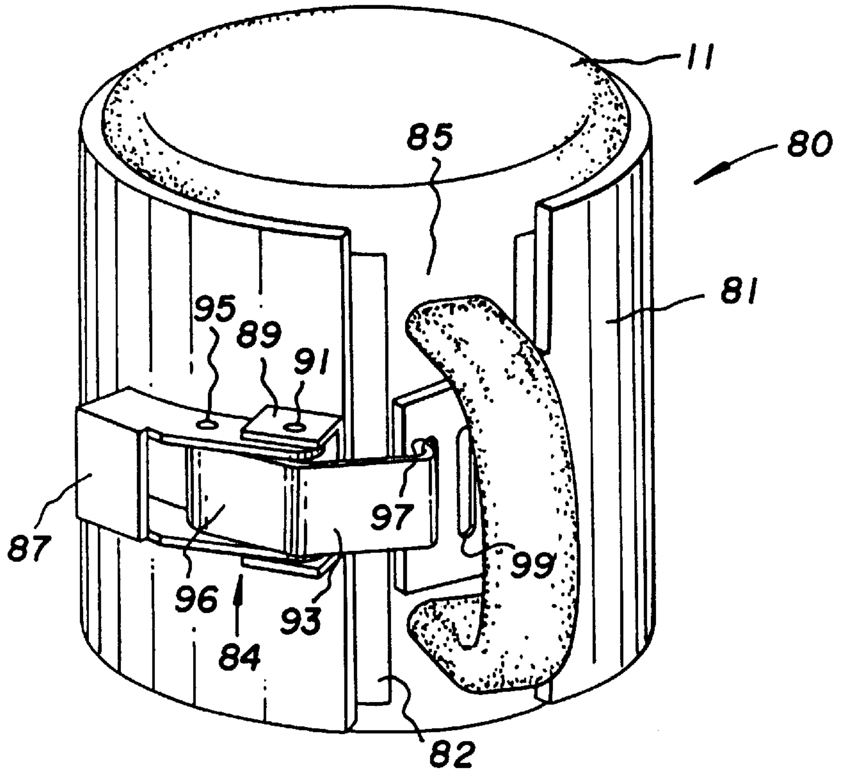
FIG. 6 is a perspective view of a clamp for use with the apparatus of FIG. 1 clamping a sublimation dye transfer against the mug.
Figure 7:
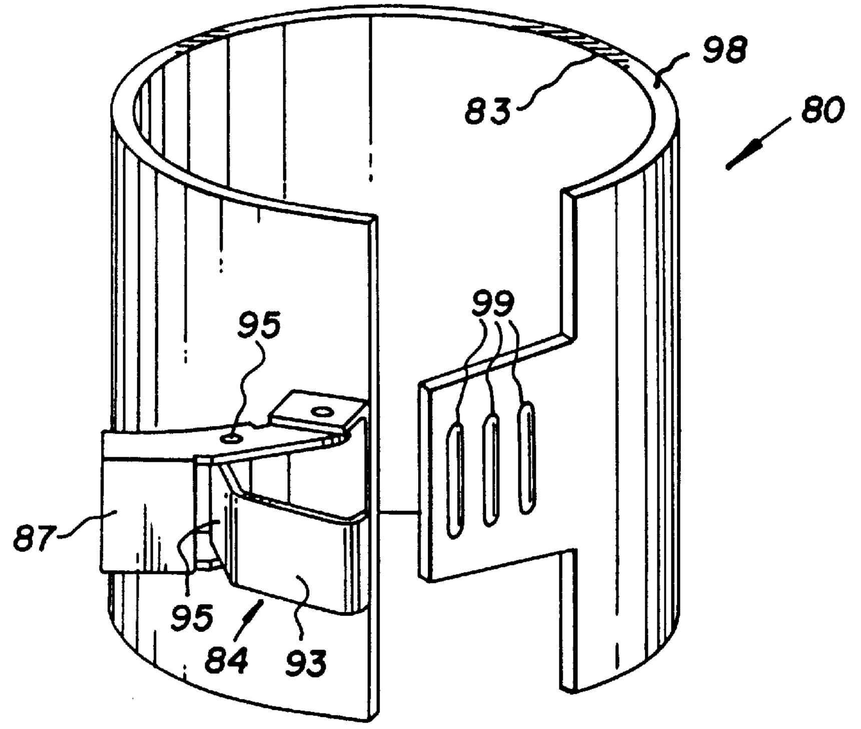
FIG. 7 is a perspective view similar to FIG. 6 illustrating the clamp of FIG. 6 in the unclamped position and without the mug and transfer.

Referring to FIGS. 6 and 7, there is illustrated a clamp 80 which is designed to be used with mug 11. A suitable clamp may be purchased from Fargo Electronics, Eden Paririe, Minn. In particular, the clamp 80 is designed to securely hold in place a sublimation dye transfer 82 during the heating process, such that the sublimation dyes from the transfer 82 will be transferred onto the mug 11. The sublimation dye transfer 82 may be any type as is commonly known and utilized for such purpose. FIG. 7 illustrates the clamp 80 in the unengaged open position for receiving a mug 11 and transfer 82, and FIG. 6 illustrates the clamp 80 in the closed position about a mug 11 with a transfer 82 clamped therebetween.

The clamp 80 is preferably made of a material such that the clamp 80 will not be adversely effected by the heat to which it is to be subjected. In the embodiment illustrated the clamp 80 is made of thin sheet metal, for example, steel or aluminum. The clamp 80 is designed with an over-the-center mechanism 84 so that the clamp 80 can be secured and/or released from engagement with the cup and transfer 82. The clamp 80 comprises a flexible shell C-shaped member 81 having a smooth inner surface lined with silicone rubber 83 designed to engage the outer surface 85 of mug 11. In the embodiment illustrated, the over-the-center mechanism is disposed at one end of the C-shaped member 81 and comprises a lever 87 pivotably mounted to mount member 89 at one end 91. A clasp member 93 is provided having one end 96 pivotably mounted to lever 87 at a point 95 spaced from end 91 and a hook member 97 at the other end. The hook member 97 is designed to engage any one of the openings 99 provided in the other end of member 81. When the over-the-center mechanism 80 is in the position illustrated in FIG. 7, a sublimation dye transfer 82 having an image to be transferred thereon, can be easily inserted in position between the clamp 80 and mug 11, and once properly positioned, the clamp 80 is secured by moving the over-the-center mechanism 84 to the position illustrated in FIG. 6. When the over-the-center mechanism 84 of the clamp 80 is in the clamping position as illustrated in FIG. 6, a clamping force is applied against the mug 11 thereby clamping the sublimation dye transfer 82 placed between the clamp 80 and mug 11. The clamp 80 includes a insulating layer 98 for minimizing the temperature of the outside surface of the clamp 80 and to provide uniform pressure between the mug 11 and transfer 82.

It is to be understood that any appropriate clamping mechanism can be used so long as a sufficient degree of pressure is applied against the transfer to maintain the transfer in intimate and direct contact with the mug 11 so that the heat being passed internally from the inside of the cup to the outside of the cup will pass directly to the clamp.

In order to more appropriately understand the present invention, a brief description of its use will now be discussed.

As illustrated in FIG. 3, a mug 11 is placed over the annular support ring 24 with a transfer medium secured to the outside surface of the mug by clamp 80. As can be seen, an appropriate turbine 52 has been provided which appropriately matches the interior configuration of the mug 11. After the mug 11 has been properly seated and is ready for transfer of the image from the transfer medium to the mug, the blower 18 is activated and the heating coil 20 is also turned on such that hot air is blown up through opening 16 to the interior of the turbine 52, such that the turbine 52 will then rotate about pin 42 causing air to be directed in a turbulent fashion about the interior surface of the mug 11. The heated air heats the mug and then travels out passage 38 to the exterior of the device. This process continues until a sufficient amount of heat has been transferred to the mug for transferring of the image from the transfer medium to the mug. An appropriate timer may be provided for controlling the appropriate heating time of the apparatus 10, or an appropriate dial timer is provided for appropriately setting the appropriate heating time for which the device will be operated, and thereafter, automatically turned off. After transfer of the image is complete and the device has been turned off, the mug 11 is removed and then the clamp 80 removed from there, removing the transfer medium, leaving the image transferred to the mug 11. Use of the turbine 52 provides a uniform flow of air, thus uniform heating of the mug occurs providing high quality image transfer to the mug. Thus, there is a controlled uniform heating of the interior surface of the mug 11 which previously has been accomplished by hit and miss heating techniques.

While the turbine 52 is preferably used with a cup-shaped structure like a mug, cup, or other similar article, the turbine can be used with a generally tubular shaped structure having two open ends. Since the turbine 52 directs the air in a direction directly at the side of the structure, a generally uniform heating of the tubular structure can be obtained.

Figure 8:
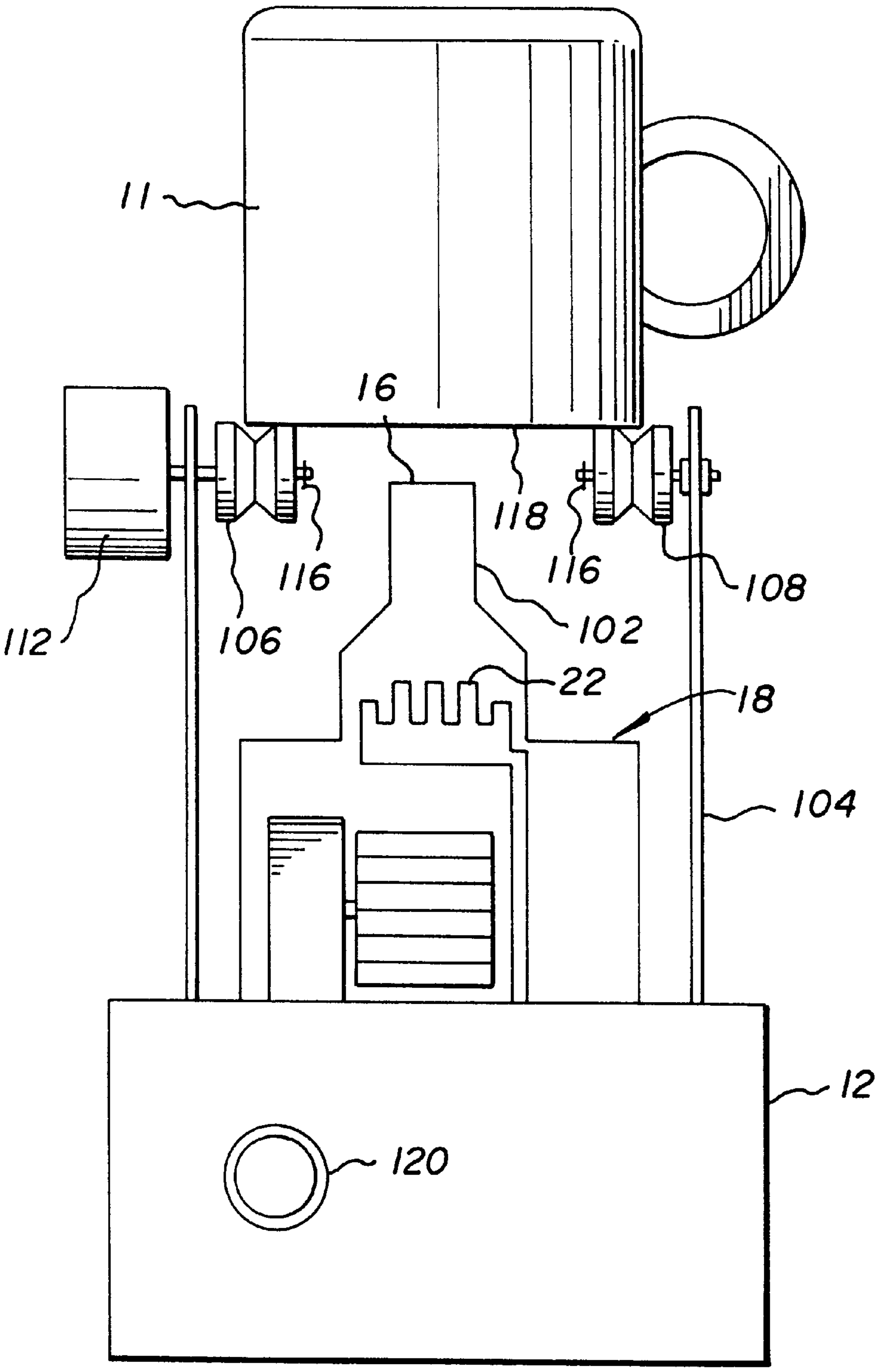
FIG. 8 is an elevational view of a modified apparatus made in accordance with the present invention illustrating a mug placed thereon for heating.
Figure 9:
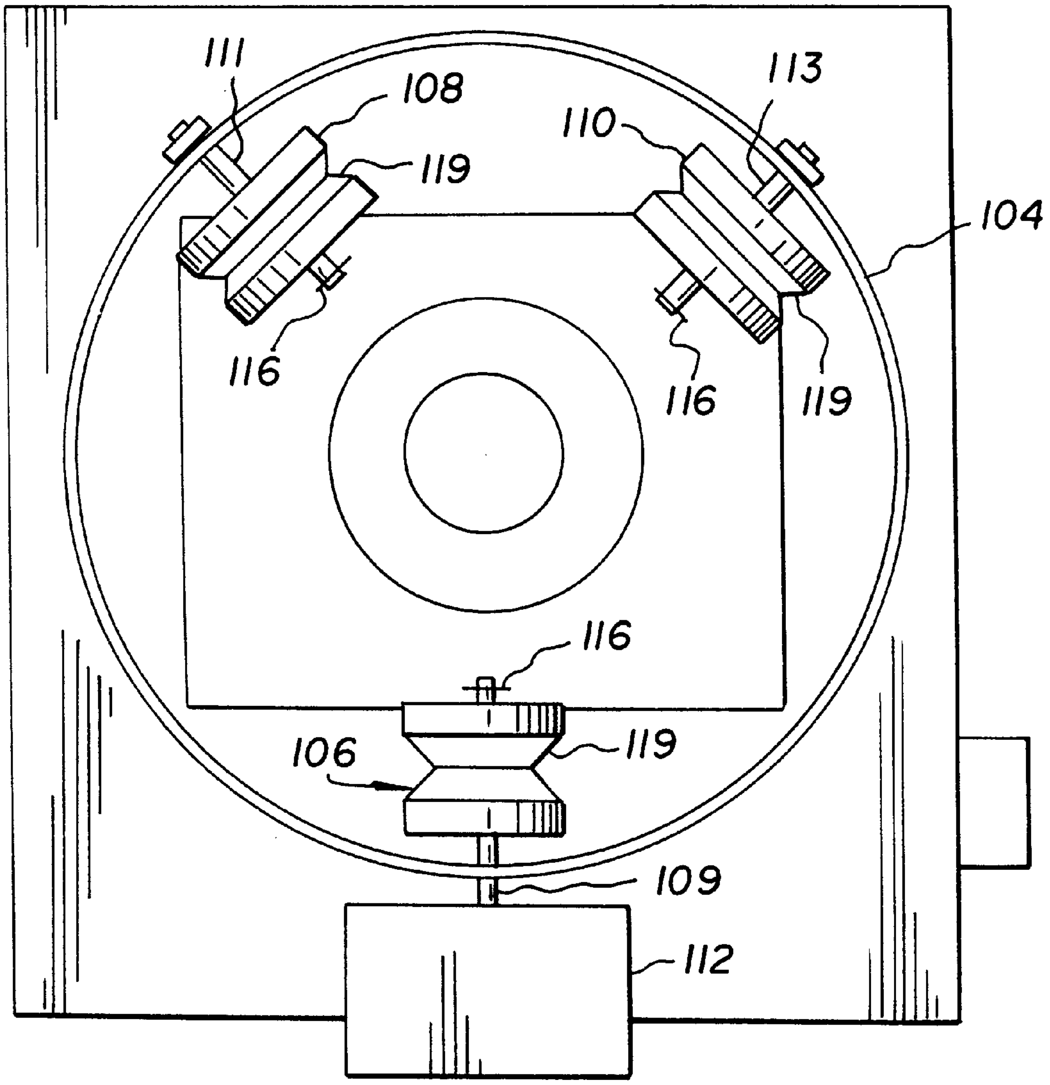
FIG. 9 is top plan view of the apparatus of FIG. 8 without the mug.

Referring to FIGS. 8 and 9, there is illustrated a modified apparatus made in accordance with the present invention. In this embodiment, like numerals indicating like parts and operation. However, in this embodiment, instead of using a turbine to assist in providing uniform heated air to the interior of the mug 11, the mug 11 is rotated about opening 16 of discharge nozzle 102. In particular, an annular support wall 104 is provided having support rollers 106,108,110, each mounted thereto by a pins 109,111,113, respectively. Roller 106 is a drive roller and is fixed in position to pin 109. Pin 109 is driven by motor 112 for rotating roller 106 about pin 109. Rollers 108,110 are free to slide along pins 111,113, respectively, so as to accommodate different size mugs as discussed later herein. Stops 116 are provided to limit the amount rollers 108,110 can move along their respective pins. Motor 112 is appropriately activated and controlled by control devices (not shown) in base 12. Each of rollers 106,108,110 have an annular groove 119, preferably V-shaped, for receiving the rim 118 of mug 11 placed in the inverted position thereon as illustrated in FIG. 8. A control timer switch 120 is provided for turning on the apparatus and controlling the time period for which the mug 11 is subjected to heated air. Appropriate temperature controls and selection devices are provided as desired for controlling the temperature and operation of the heating coils. When a mug 11 is placed on rollers 106,108,110, and the device is activated, motor 112 is turned on so that roller 106 rotates. Roller 106 is made of a material such that mug 11 will rotate about nozzle 102 and heated air will be blown up into the interior of mug 11.

An appropriate clamp 80 and medium transfer is secured to the outer surface of the mug 11 in the same manner as previously discussed with the embodiment of FIGS. 1–5. In this embodiment, the rotation of the mug allows for uniform heating of the mug for providing the image transfer thereto.

Thus, it can be seen that the present invention provides an apparatus and method for improving image transfer from transfer medium onto cylindrical-type articles.

It is to be understood that various other changes and modifications may be made without departing from the scope of the present invention. The present invention being defined by the following claims:

PARTS LIST

| | |
|---|---|
| 10 | apparatus |
| 11 | mug |
| 12 | base |
| 14 | support surface |
| 16 | opening |
| 18 | blower |
| 20 | heating coils |
| 21 | supply duct |
| 22 | arrow |
| 24 | mug support ring |
| 26 | projections |
| 28 | bottom surface |
| 30 | mating openings |
| 32 | mug support surface |
| 36 | vertical support surface |
| 38 | passages |
| 42 | support pin |
| 43 | support ribs |
| 44 | outer ends |
| 48 | upper end |
| 50 | conical point |
| 52 | turbine |
| 56 | lower plate |
| 58 | upper plate |
| 59 | interior section |
| 60 | blades |
| 61 | opening |
| 62 | mounting member section |
| 64 | conical seat |
| 66 | arrow |
| 68 | opening |
| 69 | centering ring |
| 70 | support member ribs |
| 71,73 | ends |
| 74 | interior side |
| 77 | inner surface |
| 79 | outer periphery |
| 80 | clamp |
| 81 | C-shaped member |
| 82 | sublimation dye transfer |
| 83 | silicone rubber |
| 84 | over-the-center mechanism |
| 85 | outer surface |
| 86 | sublimation dye transfer |
| 87 | lever |
| 89 | mount member |
| 90 | top |
| 91 | end |
| 92 | bottom |
| 93 | clasp member |
| 94 | arrow |
| 95 | point |
| 96 | end |
| 97 | hook member |
| 99 | openings |
| 102 | discharge nozzle |
| 104 | annular support wall |
| 106,108,110 | support rollers |
| 109,111,113 | pins |
| 112 | motor |
| 116 | stops |
| 118 | rim |
| 119 | annular groove |
| 120 | control timer switch |

What is claimed is:

1. A method of imprinting sublimation transfers onto a generally cup-shaped structure, said generally cup-shaped structure having a generally cylindrical outer surface and an inner surface, comprising the steps of:

a) applying the sublimation transfer to the outer surface of said generally cup-shaped structure;

b) applying pressure against said transfer so as to force said transfer against said outer surface; and c) supplying a flow of heated air to the interior surface of said structure using a rotary turbine placed within said cup-shaped structure said rotating turbine controlling the flow of said heated air so as to substantially evenly distribute heat internally of said structure.

2. A method of imprinting sublimation transfer onto a generally cup-shaped structure having a generally cylindrical outer surface and an inner surface, comprising the steps of:

a) applying a sublimation transfer to the outer surface of said structure;

b) applying pressure against the sublimation transfer so as to force said transfer against said outer surface;

c) applying heat internally of said structure; and d) rotating said structure so as to substantially apply even heat to said structure.

3. A method according to claim 2 wherein said heat is provided by a blower having a heater for providing heated air internally of said cup-shaped structure.

4. An apparatus for imprinting a sublimation transfer onto a cup-shaped structure having a generally cylindrical outer surface and an inner surface, said apparatus comprising:

support ring for holding of said cup-shaped structure in a predetermined position;

blower having a heater for providing a flow of heating air to the interior surface of said cup-shaped structure;

a rotary turbine for directing said air in a uniform manner about the interior surface of said cup-shaped structure from said blower, said rotary turbine directing said air in a direction generally perpendicular to side walls of said cup-shaped structure.

5. A method of imprinting sublimation transfers onto a generally tubular structure having a generally cylindrical outer surface and an inner surface, comprising the steps of:

a) applying a sublimation transfer to the outer surface of said structure;

b) applying pressure against the sublimation transfer so as to force said transfer against said outer surface;

c) applying heat internally of said structure; and d) rotating said structure so as to substantially apply even heat to said structure.

6. A method according to claim 5 wherein said heat is provided by a blower having a heater for providing heated air internally of said tubular structure.

* * * * *